United States Patent [19]

Meermoller

[11] Patent Number: 4,955,408
[45] Date of Patent: Sep. 11, 1990

[54] VACUUM-CONTROL VALVE FOR MILKING SYSTEMS

[75] Inventor: Theodor Meermoller, Oelde, Fed. Rep. of Germany

[73] Assignee: Westfalia Separator AG, Oelde, Fed. Rep. of Germany

[21] Appl. No.: 389,458

[22] Filed: Aug. 4, 1989

[30] Foreign Application Priority Data

Aug. 12, 1988 [DE] Fed. Rep. of Germany ....... 3827368

[51] Int. Cl.$^5$ .............................................. G05D 16/06
[52] U.S. Cl. .................................. 137/470; 119/14.16; 119/14.44; 137/509; 137/907
[58] Field of Search .................. 137/484.2, 484.4, 470, 137/509, 907, 114; 119/14.43, 14.44, 14.16, 14.17

[56] References Cited

U.S. PATENT DOCUMENTS

| | | | |
|---|---|---|---|
| 881,848 | 3/1908 | Day | 137/509 |
| 2,969,800 | 1/1961 | Skiruin et al. | 137/114 X |
| 4,605,040 | 8/1986 | Meermoller | 119/14.44 X |
| 4,633,845 | 1/1987 | Seleno | 137/907 X |

FOREIGN PATENT DOCUMENTS

| | | | |
|---|---|---|---|
| 294019 | 12/1988 | European Pat. Off. | 119/14.44 |
| 770453 | 10/1980 | U.S.S.R. | 119/14.44 |

Primary Examiner—Stephen M. Hepperle
Attorney, Agent, or Firm—Sprung Horn Kramer & Woods

[57] ABSTRACT

A vacuum-control valve for milking systems, with a valve body that is positioned upright and moves axially inside a housing and has a conical projection extending into an air-intake, with the valve-body cross-section changing as it moves axially, whereby the air-intake communicates with a vacuumized line. An aerodynamic structure is positioned under the valve body and is connected to the valve body by way of a rod such that the air entering the air intake exerts a downward force on the valve body.

9 Claims, 1 Drawing Sheet

VACUUM-CONTROL VALVE FOR MILKING SYSTEMS

BACKGROUND OF THE INVENTION

The invention concerns a vacuum-control valve for milking systems, with a valve body that is positioned upright and moves axially inside a housing and has a conical projection extending into an air-intake, with the valve-body cross-section changing as it moves axially, whereby the air-intake communicates with a vacuumized line.

A vacuum-control valve of this type is known from German Patent No. 2 363 125. It is a servo-controlled valve of the type predominantly employed in contemporary milking systems. Such valves have the advantage over spring-loaded or gravity-activated valves that the output of the pump that generates the vacuum can be completely exploited at an approximately constant operating vacuum. To achieve this control characteristic, the valves must be able to respond rapidly and sensitively as the consumption of air in the milking system fluctuates.

Feedback, contamination, incorrect installation, and normal aging of the rubber components, however, can cause the valve body to vibrate, leading to cyclical air intake and fluctuations in the vacuum in the lines, irritating the udders of the animals being milked.

SUMMARY OF THE INVENTION

The object of the instant invention is to improve the vacuum-control valve to the extent that the valve body will not vibrate.

The object is attained in accordance with the invention by the improvement wherein an aerodynamic structure is positioned under the valve body and is connected to the valve body by way of a rod such that the air entering the air intake exerts a downward force on the valve body.

The aerodynamic structure located within the flow of air produces resistance to the axial motion of the valve body. The resistance increases with the rate of axial motion and with the stroke of the valve body. The aerodynamic structure will accordingly damp the vibrations of the valve body that occur subject to the aforesaid conditions.

The aerodynamic structure can be either a disk or a cone.

An air-channeling tube can be associated with the air intake. The air-channeling tube can terminate above the aerodynamic structure and can terminate below the aerodynamic structure and taper up conically in its vicinity. The air-channeling tube can be transparent and have a scale in the vicinity of the aerodynamic structure.

BRIEF DESCRIPTION OF THE DRAWING

Embodiments of the invention will now be described in detail with reference to the drawings, wherein.

DETAILED DESCRIPTION OF THE INVENTION

Figures 1, 2:
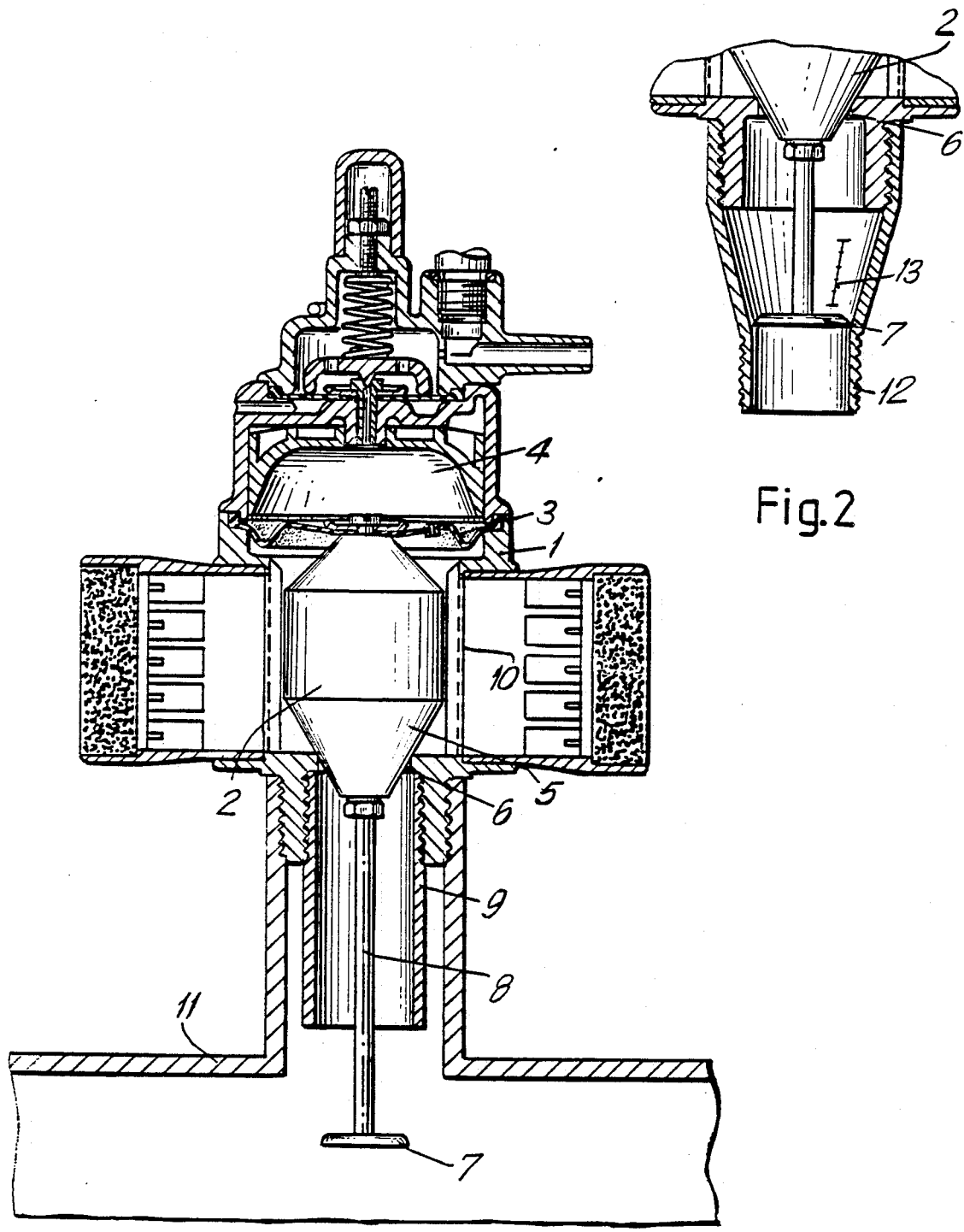
FIG. 1 is a section through a vacuum-control valve with a cylindrical air-channeling tube and FIG. 2 is a section through part of a vacuum-control valve with a conical air-channeling tube.

The housing 1 illustrated in FIG. 1 accommodates a valve body 2 that moves up and down axially. At the top of valve body 2 is a diaphragm 3 that is associated with a control chamber 4. The bottom of valve body 2 has a conical projection 5 that extends into an air intake 6. Under valve body 2 is an aerodynamic structure 7 that is connected to valve body 2 by way of a rod 8. Associated with air intake 6 is an air-channeling tube 9 that is shaped like a cylinder and terminates above aerodynamic structure 7 Housing 1 has additional air intakes 10 below diaphragm 3 to admit atmospheric air. Air-channeling tube 9 opens into a vacuumized line 11.

As the vacuum in control chamber 4 becomes more powerful, diaphragm 3 lifts valve body 2 and more or less opens air intake 6. The air flowing in through air intakes 10 arrives in vacuumized line 11 by way of air-channeling tube 9 and diminishes the vacuum in it. The aerodynamic structure 7 in the flow of air brakes the rise of valve body 2 producing the desired damping. Since the open cross-section of air intake 6 expands as valve body 2 rises, the flow of air acting on aerodynamic structure 7 will also become more powerful, resulting in a progressive damping action. This progressive damping action has been proven practical in particular for valves with a narrow range of output.

The embodiment illustrated in FIG. 2 on the other hand has been proven more practical for valves with a wider output range. This embodiment employs an air-channeling tube 12 that terminates below aerodynamic structure 7 and tapers up conically in its vicinity. Air-channeling tube 12 can be transparent and have a scale 13 in the vicinity of aerodynamic structure 7.

The air flowing in through air intake 6 in this embodiment must travel through an annular space between aerodynamic structure 7 and the air-channeling tube 12 that surrounds it. This annular space expands as valve body 2 rises to approximately the same extent as the cross-section in air intake 6 opened up by valve body 2. Even though the flow of air becomes more powerful, however, the force acting on aerodynamic structure 7 will remain almost constant, resulting in a linear damping curve. The position of aerodynamic structure 7 inside the transparent air-channeling tube 12 can be read from scale 13. This can be very practical to the user, who can exploit it to verify that the milking system is set up properly, whether output of the vacuum pump is dropping, and whether there are any leaks in the lines.

What is claimed is:

1. In a vacuum-control valve for milking systems, comprising an upright valve body having a conical projection extending into an air-intake, wherein the valve body is mounted for axial movement from a lower position wherein the air-intake is closed and an upper position wherein the air intake communicates with a vacuumized line and wherein the valve-body cross-section changes as it moves axially, the improvement comprising a rod extending below the valve body, an aerodynamic structure connected to the rod under the valve body and positioned to effect a downward force on the valve body in response to air entering the air-intake and an air-channeling tube downstream of the air intake, wherein the air-channeling tube terminates above the aerodynamic structure.

2. The vacuum-control valve as in claim 1, wherein the aerodynamic structure comprises a disk.

3. The vacuum-control valve as in claim 1, wherein the aerodynamic structure comprises a cone.

4. In a vacuum-control valve for milking systems, comprising an upright valve body having a conical projection extending into an air-intake, wherein the valve body is mounted for axial movement from a lower position wherein the air-intake is closed and an upper position wherein the air intake communicates with a vacuumized line and wherein the valve-body cross-section changes as it moves axially, the improvement comprising a rod extending below the valve body, an aerodynamic structure connected to the rod under the valve body and positioned to effect a downward force on the valve body in response to air entering the air-intake, wherein the air-channeling tube terminates below the aerodynamic structure and tapers up conically in its vicinity.

5. The vacuum-control valve as in claim 4, wherein the aerodynamic structure comprises a disk.

6. The vacuum-control valve as in claim 4, wherein the aerodynamic structure comprises a cone.

7. In a vacuum-control valve for milking systems, comprising an upright valve body having a conical projection extending into an air-intake, wherein the valve body is mounted for axial movement from a lower position wherein the air-intake is closed and an upper position wherein the air intake communicates with a vacuumized line and wherein the valve-body cross-section changes as it moves axially, the improvement comprising a rod extending below the valve body, an aerodynamic structure connected to the rod under the valve body and positioned to effect a downward force on the valve body in response to air entering the air-intake, wherein the air-channeling tube is transparent and has a scale in the vicinity of the aerodynamic structure.

8. The vacuum-control valve as in claim 1, wherein the aerodynamic structure comprises a disk.

9. The vacuum-control valve as in claim 7, wherein the aerodynamic structure comprises a cone.

* * * * *